(12) United States Patent
Johnson et al.

(10) Patent No.: US 8,116,899 B1
(45) Date of Patent: Feb. 14, 2012

(54) COMPUTER NUMERICAL CONTROL OF FIBER TENSION IN FIBER PROCESSING

(75) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 532 days.

(21) Appl. No.: 12/390,643

(22) Filed: Feb. 23, 2009

Related U.S. Application Data

(60) Provisional application No. 61/067,287, filed on Feb. 27, 2008.

(51) Int. Cl.
*G06F 19/00* (2011.01)
(52) U.S. Cl. .......................................... 700/142; 19/240
(58) Field of Classification Search .................. 19/239, 19/236, 237, 238, 240, 150; 700/142, 143
See application file for complete search history.

(56) References Cited

U.S. PATENT DOCUMENTS

| 5,384,934 | A  * | 1/1995 | Dammig ......................... 19/239 |
| 6,088,882 | A  * | 7/2000 | Leifeld ........................... 19/239 |
| 6,266,573 | B1 * | 7/2001 | Promoli ........................ 700/142 |
| 6,430,781 | B1 * | 8/2002 | Breuer et al. .................. 19/239 |
| 6,543,092 | B2 * | 4/2003 | Breuer ............................ 19/236 |
| 6,874,204 | B2 * | 4/2005 | Dammig et al. ............... 19/236 |
| 7,103,440 | B2 * | 9/2006 | Dammig et al. ............. 700/143 |

* cited by examiner

*Primary Examiner* — Danny Worrell
(74) *Attorney, Agent, or Firm* — Stephen C. Beuerle; Procopio Cory Hargreaves & Savitch LLP

(57) ABSTRACT

A CNC tensioning system for applying tension in one or more fibers or fiber bundles drawn into a fiber process in a fiber movement direction includes a reverse torque mechanism that applies a net torque on the one or more fibers or fiber bundles in a reverse direction from the fiber movement direction; a motion-control motor that drives the reverse torque mechanism to apply a net torque on the one or more fibers or fiber bundles in a reverse direction from the fiber movement direction; and a computer system controlling the motion-control motor to incrementally control net torque on the one or more fibers or fiber bundles in a reverse direction from the fiber movement direction in discrete incremental values.

10 Claims, 2 Drawing Sheets

COMPUTER NUMERICAL CONTROL OF FIBER TENSION IN FIBER PROCESSING

CROSS-REFERENCE TO RELATED APPLICATION

This application claims priority to U.S. provisional patent application 61/067,287 filed Feb. 27, 2008 under 35 U.S.C. 119. U.S. provisional patent application 61/067,287 is incorporated by reference herein.

FIELD OF THE INVENTION

The field of the invention generally relates to systems and methods for tensioning fibers and fiber bundles in fiber processing.

BACKGROUND OF THE INVENTION

The processing of fiber in all applications, from weaving, stitching, fabric manufacturing to composites processing, requires the dispensing of the fiber, or bundles of fibers, from a source such as a doff, spool, or other consolidation grouping. Between the dispensing and the processing, it is most often necessary for the fibers, or bundle of fibers, to be tensioned to process correctly. Appropriate tension in the fiber, or bundles of fiber, will result in processing that is desired and acceptable. The method of creating tension in fiber or fiber bundles has been mechanical, and has performed via methods involving bars, springs, weights, brakes, dancers, and a multitude of frictional devices (all of these referred to generally herein as "mechanical systems"). All of these mechanical methods have limitations, and require human interface for adjustment to properly process the fiber or fiber bundles.

For example, frequently a set of bars are used to serpentine the fibers in a repeated pattern over/under bars. This frictional impairment to a free-flowing fiber results in tension. The mechanical setting of these bars in spaced relation to each other determines the resulting tension.

Other existing systems use Ultra-High Molecular Weight (UHMW) plastic blocks that have eyelets formed (ceramic eyelets can also be used). Through a series of eyelets or holes in the UHMW block, one can serpentine the fiber back-and-forth until enough friction causes the desired resulting tension. Other systems have mechanical brake and friction systems to back-tension the spools of fiber to cause resistance in the pull-off of fiber. Besides being variable due to wear and diameter of spools, these methods have proven unreliable.

With some operations running hundreds and even thousands of fibers or fiber bundles in parallel, it is very important to have a close tolerance on the tension of each fiber or fiber bundle. Technologies of the past using mechanical tensioning systems can be vastly improved.

There is also a need to have very accurate tension, at high levels, in some composites processing of both thermoset and thermoplastic composites. These requirements impose a need to have consistent, wear resistant tension that is extremely accurate and easy to program with a CNC approach.

SUMMARY OF THE INVENTION

Accordingly, an aspect of the invention involves a new and improved system and method for tensioning fibers and fiber bundles. In the system and method, a computer numerical controlled (CNC) motion control motor is activated in a manner to incrementally resist the torque applied to the motor when the fiber or fiber bundles are pulled from the system. Through computerized control, a significant number of variables can be programmed with feedback control options. In the system and method, the fiber or fiber bundles are automatically tensioned, independent of processing speeds. The system and method are non-abrasive to the fiber material. Additionally, because of the computerized and electronic nature of the system, very discrete increments of tension can be programmed into the system to adjust tension in much smaller and controlled levels than ever possible with mechanical systems in the past, typically achieving resolutions as high as 1000 to 64,000 increments over the full continuous output range depending on the system requirements. For example a servo motor, with feedback and closed loop motion control capability (commonly referred to as a CNC system), can be adjusted in a manner to achieve tensions in fibers or fiber bundles in increments that are very small (e.g., 0.1-10 grams of tension). This level of control is a significant improvement in fiber processing and results in much-improved end-products.

Another aspect of the invention involves a CNC tensioning system for applying tension in one or more fibers or fiber bundles drawn into a fiber process in a fiber movement direction. The CNC tensioning system includes a reverse torque mechanism that applies a net torque on the one or more fibers or fiber bundles in a reverse direction from the fiber movement direction; a motion-control motor that drives the reverse torque mechanism to apply a net torque on the one or more fibers or fiber bundles in a reverse direction from the fiber movement direction; and a computer system controlling the motion-control motor to incrementally control net torque on the one or more fibers or fiber bundles in a reverse direction from the fiber movement direction in discrete incremental values.

DESCRIPTION OF EMBODIMENT(S) OF INVENTION

Figure 1:
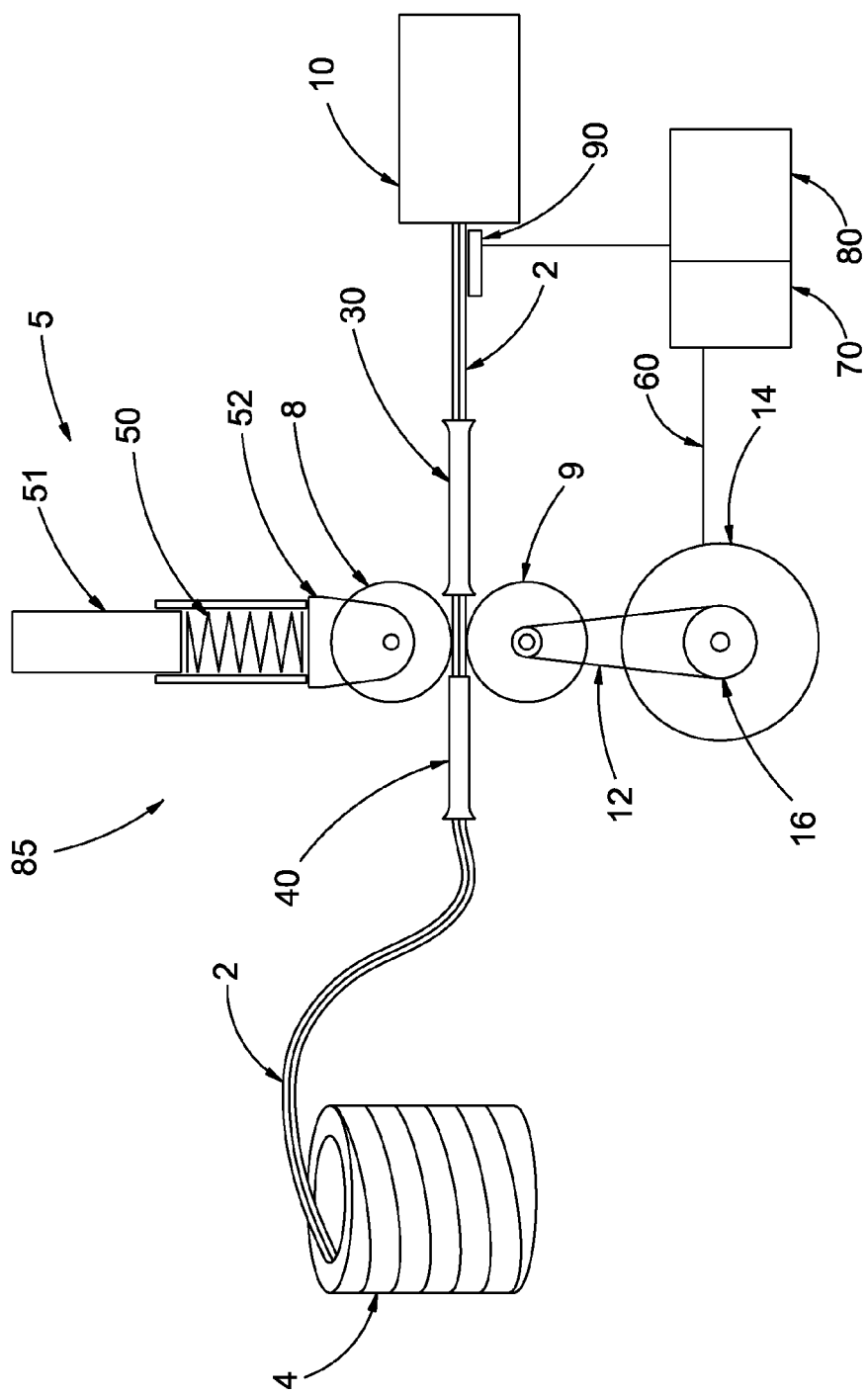
FIG. 1 is a diagram of an embodiment of a system and method for tensioning fibers and fiber bundles.

With reference to FIG. 1, an embodiment of a CNC system 5 and method for tensioning fibers or fiber bundles 2 in fiber processing will be described. Before describing the system 5 and method, a number of words used herein will be defined as follows:

Fiber or fiber bundle: Herein shall mean a single fiber, or a bundle of fibers or a tape of side-by-side fibers, or a braid of fibers, and in all cases may be with or without constituents such as resin, either thermoset or thermoplastic, or constituents such as chemically added adhesive, binder, binders, or sizing, and can be any of the organic or inorganic fibers that exist as of today, or in the future, including, but not limited to glass, aramid, s-glass, HiPerTex, carbon, Graphite, polyethylene, thermoplastic drawn from any thermoplastic resin, wool, cotton, synthetic, or metallic, such as copper, steel or aluminum or any other metal that would normally be considered "wire", but herein shall be considered a "fiber" or "fiber bundle".

Doff: Herein shall mean a spool of tangent-pull fiber or fiber bundles, or a grouping of fiber or fiber bundles such as they are dispensed by way of a center-pull method, or a spool of fiber or fiber bundles, or any method of packaging such that a finite length of fiber or fiber bundles can be delivered to a manufacturer.

Process: Herein shall mean the end use application of the tensioned fiber or bundle of fibers. The process could be any composites process such as pultrusion or filament winding or RTM or molding or manufacturing of preforms for other manufacturers to process, or the manufacture of tape, or barstock via extrusion or pull forming or the like. The process could be textile in nature and involve weaving, stitching, fabric or carpet manufacture, or cloth manufacture, or any process that would use the fiber or fiber bundles as defined above and the require a precise tension for acceptable processing.

As shown in FIG. 1, an embodiment of a packaged doff 4 is shown on left-hand side of the figure. In the embodiment shown, the packaged doff 4 has a center-pull configuration. On the right-hand side of the figure a fiber process 10 is shown.

An embodiment of the CNC tensioning system 5 will now be described in more detail. Although only a single CNC tensioning system 5 will be shown and described, in one or more embodiments of the invention, multiple CNC tensioning systems 5 are provided for the fiber process 10. For example, but not by way of limitation, in one embodiment, many, even hundreds, of CNC tensioning systems are fixed to an inertial frame, and are in spaced relation to one another. The CNC tensioning system 5 is fixed to an inertial frame because tensioning of the fiber or fiber bundles 2 will only occur if the system 5 and the process 10 are in spaced relation to each other and both are fixed to an inertial frame such as, for example, Earth, ground, floor, or the like.

The CNC tensioning system 5 includes an outlet tube 30 with an outlet bellmouth and an inlet tube 40 with an inlet bellmouth. These tubes 30, 40 are fixed to an inertial frame. Also fixed to the inertial frame are a pressure roller 8 and flexible roller 9. To provide problem-free operation of the system 5 and method, it is important to properly space these four elements (pressure roller 8, flexible roller 9, outlet tube 30, inlet tube 40). Actual spacing is dependent on the bundle diameter, material properties, tube and bell mouth diameter, and roller configuration. The mechanism configuration and spacing must apply sufficient frictional force while maintaining the fiber bundle in a generally consolidated state and must prevent buckling of individual bundle filaments or groups of filaments.

Also shown is an axle support 52 for the pressure roller 8 and a spring 50, which is used to apply normal force to the fiber or fiber bundles 2 when an input device 51, such as a pin, block, lever, solenoid, or other device is applied in a fixed manner to deflect the spring 50.

A motion-control motor 14 with a sprocket 16 drives a direct drive mechanism (e.g., belt, chain, coupling, gear train or the like) 12 to drive the flexible roller 9. An electrical connection 60 is provided from the motor 14 to electronics 70 (e.g., amplifiers) and/or computer system 80 (e.g., computer(s), software, and/or hardware).

A reverse torque mechanism 85 of the CNC tensioning system 5 is formed by the roller 8, flexible roller 9, spring 50, motor 14, direct drive mechanism 12, and computer system 80. In alternative embodiments, the reverse torque mechanism 85 may have alternative configurations and/or components.

When the CNC tensioning system 5 is operated, one mode of control is torque, which can be incrementally controlled in increments of as many as 10,000 discrete incremental values. A high-resolution input signal generated from a software program stored in memory in the computer system 80 commands the fiber or fiber bundles 2 to move or not move through the tubes 30, 40 as the process 10 pulls the fiber or fiber bundles 2 into the process 10. In the CNC tensioning system 5, the servo motor 14 is programmed (and/or controlled by the computer system 80) with reverse torque of very small values or programmed (and/or controlled by the computer system 80) to move such that the net torque is in the reverse direction from the direction of fiber movement. As the process 10 pulls the fiber or fiber bundles 2, the motor 14 puts a very small increment of reverse torque, creating tension in the fiber or fiber bundles 2 between the CNC tensioning system 5 and the process 10. For example, the CNC tensioning system 5 can be adjusted in a manner to achieve tensions in the fibers or fiber bundles 2 in increments that are very small (e.g., 0.1-10 grams of tension). This tension is independent, substantially, of line speed, but can be adjusted with feedback to maintain a desired tension at an entry point of the processing 10. For example, but not by way of limitation, a sensor 90 senses the line speeds and corresponding signals are sent to the computer system 80 for feedback control of tension in the fiber or fiber bundles 2. For example, the CNC tensioning system 5 achieves tensions in the fibers or fiber bundles 2 in increments that are very small (e.g., 0.1-10 grams of tension). It has been shown that very small changes in tension can be maintained with the 10,000 discrete input values available. In alternative embodiment, other numbers of discrete input values other than 10,000 are provided depending on the needs of the system and the resolution of the control hardware.

It has also been shown that the reverse torque can be such that the rollers 8, 9 are extended (into the plane of the drawing of FIG. 1) such that more than one stream of fiber or fiber bundles 2 are integrated into the tensioning system 5 driven by the servo motor 14.

In one or more embodiments, several key features are available. For example, but not by way of limitation, different spring constant springs 50 are substituted to give more dynamic clamping of the fiber or fiber bundles 2. The computer control provided by computer system 80 allows for precise speed measurements and feedback control. The tensioning increments allow for very discrete changes in tension. In one embodiment, the system 5 is reversed (i.e., the system 5 pulls the fiber or fiber bundles 2 towards the system 5 for taking slack out of any fiber or fiber bundle lines. In another embodiment, if the rollers 8, 9 should slip as high reverse torque is commanded from the software of the computer system 80, an over-ride program of the computer system 80 prevents damage to the fiber or fiber bundles 2 by preventing excessive reverse motion.

Figure 2:
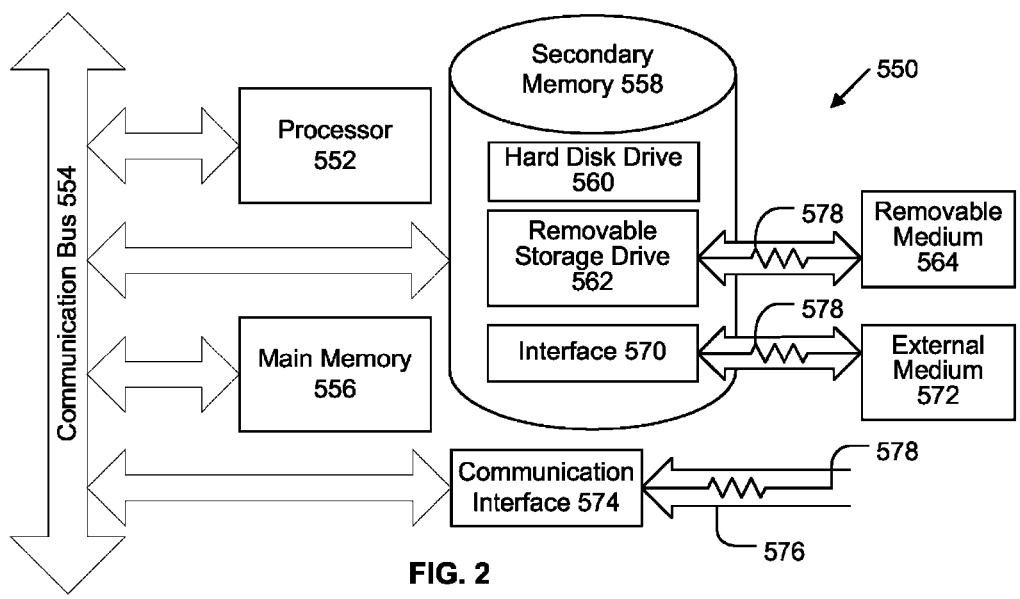
FIG. 2 is a block diagram illustrating an example computer system that may be used in connection with various embodiments described herein.

FIG. 2 is a block diagram illustrating an example computer system 550 that may be used in connection with various embodiments described herein. For example, the computer system 550 may be used in conjunction with the electronics 70 and/or computer system 80 (e.g., computer(s), software, and/or hardware). However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A CNC tensioning system for applying tension in one or more fibers or fiber bundles drawn into a fiber process in a fiber movement direction, comprising:
   a reverse torque mechanism that applies a net torque on the one or more fibers or fiber bundles in a reverse direction from the fiber movement direction;
   a motion-control motor that drives the reverse torque mechanism to apply a net torque on the one or more fibers or fiber bundles in a reverse direction from the fiber movement direction;
   a computer system controlling the motion-control motor to incrementally control net torque on the one or more fibers or fiber bundles in a reverse direction from the fiber movement direction in discrete incremental values,
   wherein the CNC tensioning system includes an outlet tube and an inlet tube that the one or more fibers or fiber bundles pass through, and a space between the outlet tube and the inlet tube where the reverse torque mechanism applies the net torque on the one or more fibers or fiber bundles in a reverse direction from the fiber movement direction.

2. The CNC tensioning system of claim 1, further including one or more doffs supplying the one or more fibers or fiber bundles.

3. The CNC tensioning system of claim 1, wherein multiple CNC tensioning systems are provided for the fiber process.

4. The CNC tensioning system of claim 1, wherein the reverse torque mechanism includes a pressure roller and flexible roller, at least one of the pressure roller and the flexible roller urged towards the other roller to engage the one or more fibers or fiber bundles.

5. The CNC tensioning system of claim 4, wherein the reverse torque mechanism includes a spring to urge at least one of the pressure roller and the flexible roller towards the other roller to engage the one or more fibers or fiber bundles.

6. The CNC tensioning system of claim 4, further including a direct drive mechanism and the motion-control motor drives the drive mechanism to drive the flexible roller.

7. The CNC tensioning system of claim 1, wherein the motion-control motor is a servo motor.

8. The CNC tensioning system of claim 1, wherein the one or more fibers or fiber bundles are drawn into a fiber process at a line speed, and the reverse torque mechanism applies a net torque on the one or more fibers or fiber bundles in a reverse direction from the fiber movement direction that is substantially independent of line speed of the one or more fibers or fiber bundles.

9. The CNC tensioning system of claim 1, wherein the one or more fibers or fiber bundles are drawn into a fiber process at a line speed, and the CNC tensioning system further includes a sensor that senses line speed of the one or more fibers or fiber bundles, and the computer system communicates with the sensor for applying feedback control of tension in the one or more fibers or fiber bundles by the reverse torque mechanism.

10. The CNC tensioning system of claim 1, wherein the CNC tensioning system achieves tensions in the fibers or fiber bundles in increments of 0.1-10 grams of tension.

* * * * *